US012629623B2

(12) United States Patent
Armstrong et al.

(10) Patent No.: US 12,629,623 B2
(45) Date of Patent: May 19, 2026

(54) AUTOMATICALLY RENEWING AIR FILTER

(71) Applicant: Infinity Filter, LLC, Miami, FL (US)

(72) Inventors: Chad Armstrong, Boca Raton, FL (US); Stewart Kaiser, Palm Beach Gardens, FL (US); Yannick Ayache, Miami Beach, FL (US)

(73) Assignee: Infinity Filter, LLC

( * ) Notice: Subject to any disclaimer, the term of this patent is extended or adjusted under 35 U.S.C. 154(b) by 293 days.

(21) Appl. No.: 18/365,481

(22) Filed: Aug. 4, 2023

(65) Prior Publication Data

US 2024/0042366 A1     Feb. 8, 2024

(51) Int. Cl.
| | |
|---|---|
| *B01D 46/16* | (2006.01) |
| *B01D 46/00* | (2022.01) |
| *B01D 46/42* | (2006.01) |

(52) U.S. Cl.
CPC ......... *B01D 46/16* (2013.01); *B01D 46/0002* (2013.01); *B01D 46/0032* (2013.01); *B01D 46/4227* (2013.01); *B01D 2275/10* (2013.01); *B01D 2279/50* (2013.01)

(58) Field of Classification Search
CPC ............... B01D 46/16; B01D 46/0002; B01D 46/0032; B01D 46/4227; B01D 2275/10; B01D 2279/50; B01D 46/18
See application file for complete search history.

(56) References Cited

U.S. PATENT DOCUMENTS

| | | | | | |
|---|---|---|---|---|---|
| 2,579,440 | A | * | 12/1951 | Palmer ...................... | B03C 3/74 |
| | | | | | 55/354 |
| 3,261,149 | A | * | 7/1966 | Althuser ................ | B01D 46/18 |
| | | | | | 55/354 |
| 3,375,638 | A | * | 4/1968 | Dungler .................. | F24F 8/192 |
| | | | | | 55/351 |

(Continued)

FOREIGN PATENT DOCUMENTS

| | | |
|---|---|---|
| CN | 105299752 A | 2/2016 |
| CN | 107684783 A | 2/2018 |

(Continued)

OTHER PUBLICATIONS

AAF International B.V., "Roll-O-Matic, Automatic Renewable Media Air Filter" (1999).

*Primary Examiner* — Jennifer Dieterle
*Assistant Examiner* — Phillip Y Shao
(74) *Attorney, Agent, or Firm* — AEON Law, PLLC; Adam L. K. Philipp; James Namiki

(57) ABSTRACT

An air filter assembly and method of using the assembly are described. The assembly can include a filter media cartridge and a filter frame connected to the filter media cartridge. The filter media cartridge can have a cartridge body defining an internal volume, an aperture in a wall of the body, a supply roller for supplying filter media, and a take-up roller for receiving the filter media. The filter frame is configured for an air handler filter slot of an HVAC system. The filter media can extend about the longitudinal axis of the filter frame (Continued)

from and back to the filter media cartridge such that a double layer of the filter media covers an air flow opening defined by the filter frame. The filter frame can have a pair of side frame sections, each having an expansion joint that allows the side frame section to be lengthened or shortened.

17 Claims, 12 Drawing Sheets

(56)                     References Cited

U.S. PATENT DOCUMENTS

| | | | | |
|---|---|---|---|---|
| 4,221,576 | A | | 9/1980 | Phillips, Jr. |
| 4,229,187 | A * | 10/1980 | Stockford | B03C 3/30 |
| | | | | 55/528 |
| 4,230,465 | A * | 10/1980 | Hope | B01D 46/22 |
| | | | | 95/271 |
| 4,378,980 | A * | 4/1983 | Long | B01D 46/185 |
| | | | | 55/470 |
| 5,234,481 | A * | 8/1993 | Jardinier | F24F 13/28 |
| | | | | 55/352 |
| 5,912,423 | A * | 6/1999 | Doughty | F24F 8/10 |
| | | | | 95/107 |
| 6,152,998 | A * | 11/2000 | Taylor | B01D 46/444 |
| | | | | 96/429 |
| 8,657,936 | B2 * | 2/2014 | Sullivan | B01D 46/18 |
| | | | | 96/417 |
| 9,375,669 | B2 | 6/2016 | Spiegel | |
| 9,855,523 | B2 * | 1/2018 | Cheng | B01D 39/08 |
| 10,518,207 | B2 * | 12/2019 | Taylor | B01D 46/185 |
| 2005/0178734 | A1 * | 8/2005 | Kilmer | B01D 33/056 |
| | | | | 210/791 |
| 2009/0242469 | A1 * | 10/2009 | Calabrese | B01D 46/88 |
| | | | | 55/354 |
| 2010/0077923 | A1 | 4/2010 | Lewis | |
| 2010/0291848 | A1 * | 11/2010 | Swoboda | B03C 3/16 |
| | | | | 454/53 |
| 2021/0106936 | A1 * | 4/2021 | Portelli | B01D 39/08 |
| 2021/0121811 | A1 | 4/2021 | Kim et al. | |
| 2022/0032317 | A1 * | 2/2022 | Kim | B03C 3/86 |

FOREIGN PATENT DOCUMENTS

| | | |
|---|---|---|
| DE | 7140423 | 5/1972 |
| WO | 2020108190 A1 | 6/2020 |

* cited by examiner

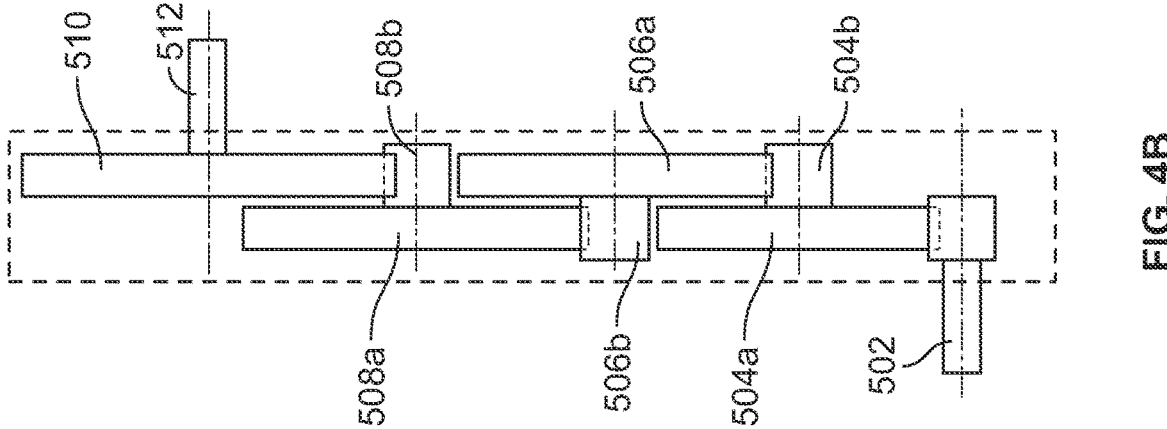
FIG. 4B
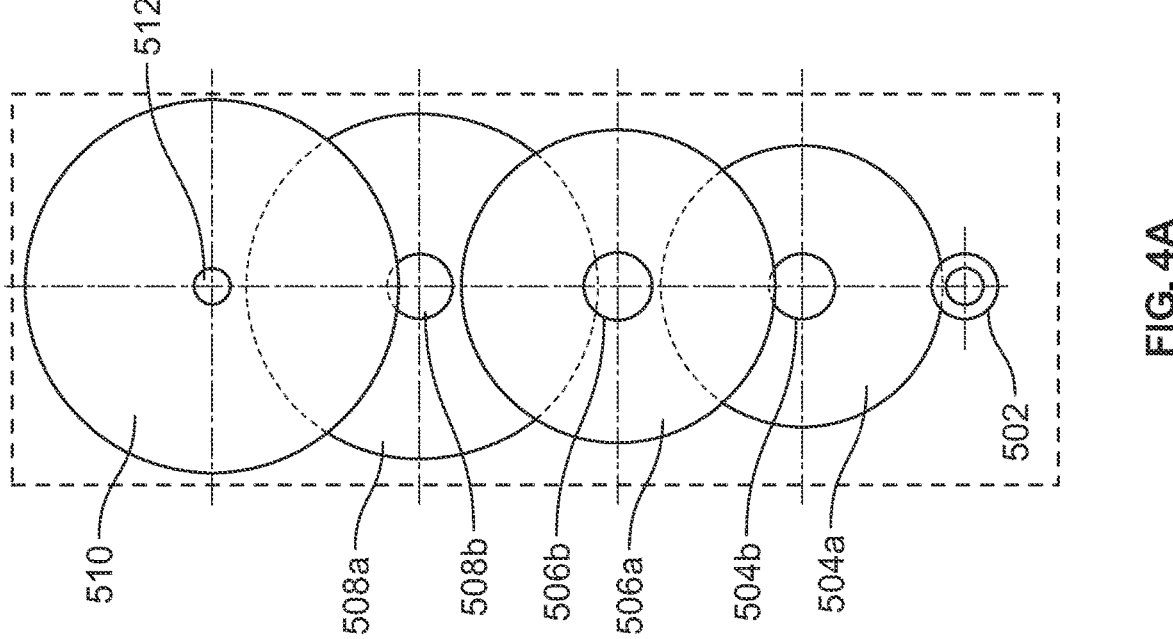
FIG. 4A
500

AUTOMATICALLY RENEWING AIR FILTER

CROSS-REFERENCES TO RELATED APPLICATIONS

This application claims the benefit of priority under 35 U.S.C. § 119(e) of U.S. Provisional Application Ser. No. 63/395,036 filed on Aug. 4, 2022, the content of which is relied upon and incorporated herein by reference in its entirety.

FIELD

This disclosure relates generally to air filters, and more particularly to automatically renewing filters for installation in air handling units of heating, ventilation, and air conditioning (HVAC) systems.

BACKGROUND

One cause of premature failure of HVAC air handlers is excessive motor strain due to dirty air filters. The restricted air flow resulting from the dirty filter causes the fan to work harder, which can eventually lead the motor to burn out. Insufficient air flow can also cause the evaporator coil to freeze over, leading to poor system performance and possibly water damage. Regularly changing the air filter can avoid these extreme issues, but even normal dirt loading of an air filter after a few weeks causes the motor to work significantly harder than with a clean filter. Additionally, a dirty filter does not sufficiently filter the air. Increased pressure across a dirty filter can result in previously trapped dirt being released into the air stream can dirty air ducts and be recirculated into the conditioned dwelling or other structure. Accordingly, there is a need for improved air filters for HVAC air handlers.

SUMMARY

The above-mentioned shortcomings, disadvantages and problems are addressed herein, which will be understood by reading and studying the following specification.

In various embodiments, an automatically renewing air filter assembly is provided. In some embodiments, the air filter assembly includes a filter media cartridge attached to a filter frame defining an air flow opening and dimensioned for insertion into an air handler. In some embodiments, the filter media from the filter media cartridge extends through the filter frame across the air flow opening and back to the filter media cartridge. In some embodiments, the filter media cartridge is configured to automatically supply new filter media while simultaneously taking up used filter media.

In various embodiments, an air filter assembly is provided, the air filter assembly comprising: a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume; wherein the filter frame has a rectangular cuboid shape with a longitudinal axis and a lateral axis, the filter frame being configured to be received by an air handler filter slot of a heating, ventilation, and air conditioning (HVAC) system; and wherein the filter media extends about the longitudinal axis of the filter frame from and back to the filter media cartridge such that a double layer of the filter media covers the air flow opening.

In some embodiments, the filter media cartridge further comprises a motor for driving the filter media from the supply roller, through the air flow opening, and to the take up roller.

In some embodiments, the motor is powered by one or more batteries, an AC or DC power supply, the HVAC system, or a combination thereof.

In some embodiments, the filter frame comprises a pair of side frame sections, wherein each respective side frame section comprises an expansion joint that allows the side frame section to be lengthened or shortened about the longitudinal axis to accommodate air handler filter slots of various widths.

In some embodiments, the filter frame comprises an end roller positioned at a second end, wherein the filter media from the supply roller is routed through the air flow opening from the first end to the end roller, which then returns the filter media to the first end.

In some embodiments, the filter media from the supply roller is guided by an upper aperture routing roller to the air flow opening, the upper aperture routing roller being positioned adjacent to a first edge of the aperture.

In some embodiments, the filter media returns from the end roller and is guided to the take up roller by a lower aperture routing roller, the lower aperture routing roller being positioned adjacent to a second edge of the aperture.

In some embodiments, the filter media is guided by a take up routing roller in the internal volume, the take up routing roller being positioned adjacent to the cartridge body wall and coplanar to the lower aperture routing roller.

In some embodiments, the filter frame is removably connected at the first end to the filter media cartridge.

In some embodiments, the filter frame comprises a pair of side frame sections, wherein each respective side frame section comprises a blocking section that allows the side frame section to accommodate a range of lengths of air handler filter slots.

In some embodiments, the filter media is electrostatically charged, and the respective layers of the double layer of the filter media have opposite charges.

In various embodiments, an air filter assembly is provided, the air filter assembly comprising: a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume; wherein the filter frame is a rectangular cuboid having a longitudinal axis and a lateral axis, the filter frame being configured to be received by an air handler filter slot of a heating, ventilation, and air conditioning (HVAC) system; and wherein the filter frame comprises a pair of side frame sections, wherein each respective side frame section includes an expansion joint that allows the side frame section to be lengthened or shortened about the longitudinal axis to accommodate air handler filter slots of various widths.

In some embodiments, the filter media cartridge further comprises a motor for driving the filter media from the supply roller, through the air flow opening, and to the take up roller.

In some embodiments, the filter frame comprises an end roller positioned at a second end, wherein the filter media from the supply roller is routed through the air flow opening from the first end to the end roller, which then returns the filter media to the first end.

In some embodiments, each respective side frame section comprises a blocking section that allows the side frame section to accommodate a range of lengths of air handler filter slots.

In some embodiments, the filter media extends about the longitudinal axis of the filter frame from and back to the filter media cartridge such that a double layer of the filter media covers the air flow opening; and wherein the filter media is electrostatically charged, and the respective layers of the double layer of the filter media have opposite charges.

In various embodiments, a method of filtering air before the air passes through an air handler filter slot of a heating, ventilation, and air conditioning (HVAC) system, the method comprising: providing an air filter assembly comprising: a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume; wherein the filter frame is a rectangular cuboid having a longitudinal axis and a lateral axis, the filter frame being configured to be received by an air handler filter slot of a heating, ventilation, and air conditioning (HVAC) system; and wherein the filter media extends about the longitudinal axis of the filter frame from and back to the filter media cartridge such that a double layer of the filter media covers the air flow opening; installing the air filter assembly into the air handler filter slot; and connecting the air filter assembly to a power source.

In some embodiments, the filter media cartridge further comprises a motor for driving the filter media from the supply roller, through the air flow opening, and to the take up roller.

In some embodiments, the filter frame comprises a pair of side frame sections, wherein each respective side frame section includes an expansion joint that allows the side frame section to be lengthened or shortened about the longitudinal axis to accommodate air handler filter slots of various widths.

In some embodiments, the filter frame comprises an end roller positioned at a second end, wherein the filter media from the supply roller is routed through the air flow opening from the first end to the end roller, which then returns the filter media to the first end.

In addition to the aspects and advantages described in this summary, further aspects and advantages will become apparent by reference to the accompanying drawings and by reading the detailed description that follows. The drawings are included to provide a further understanding, aspects, and advantages of the various embodiments and are incorporated into and constitute a part of this specification. The drawings illustrate the various embodiments described herein and, together with the detailed description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

FIG. 4A is a front view of the gearset used in the air filter assembly of FIG. 3;

FIG. 4B is a side view of the gearset used in the air filter assembly of FIG. 3;

Figure 1A:
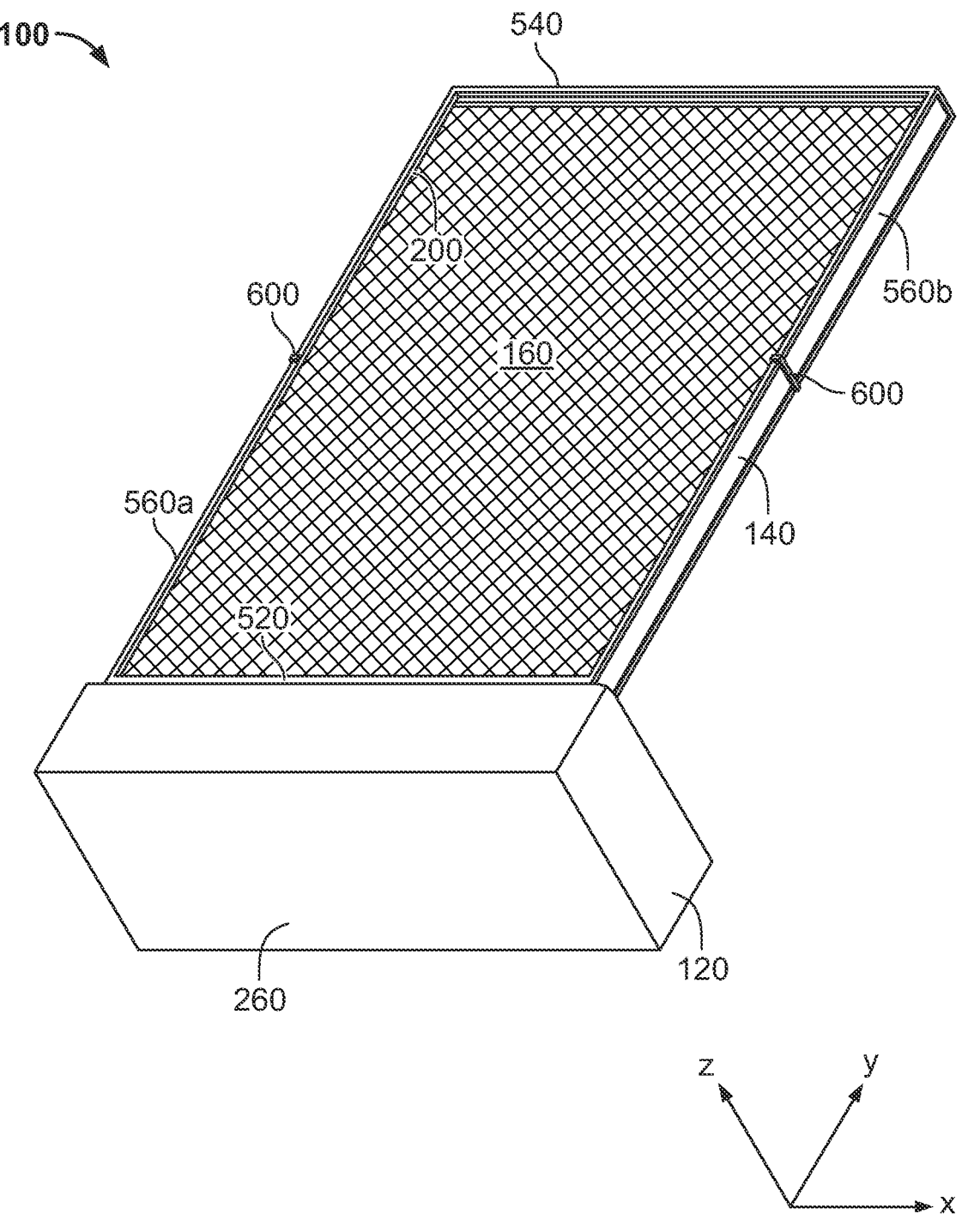
FIG. 1A is a perspective view of an air filter assembly, in accordance with embodiments described herein.
Figure 1B:
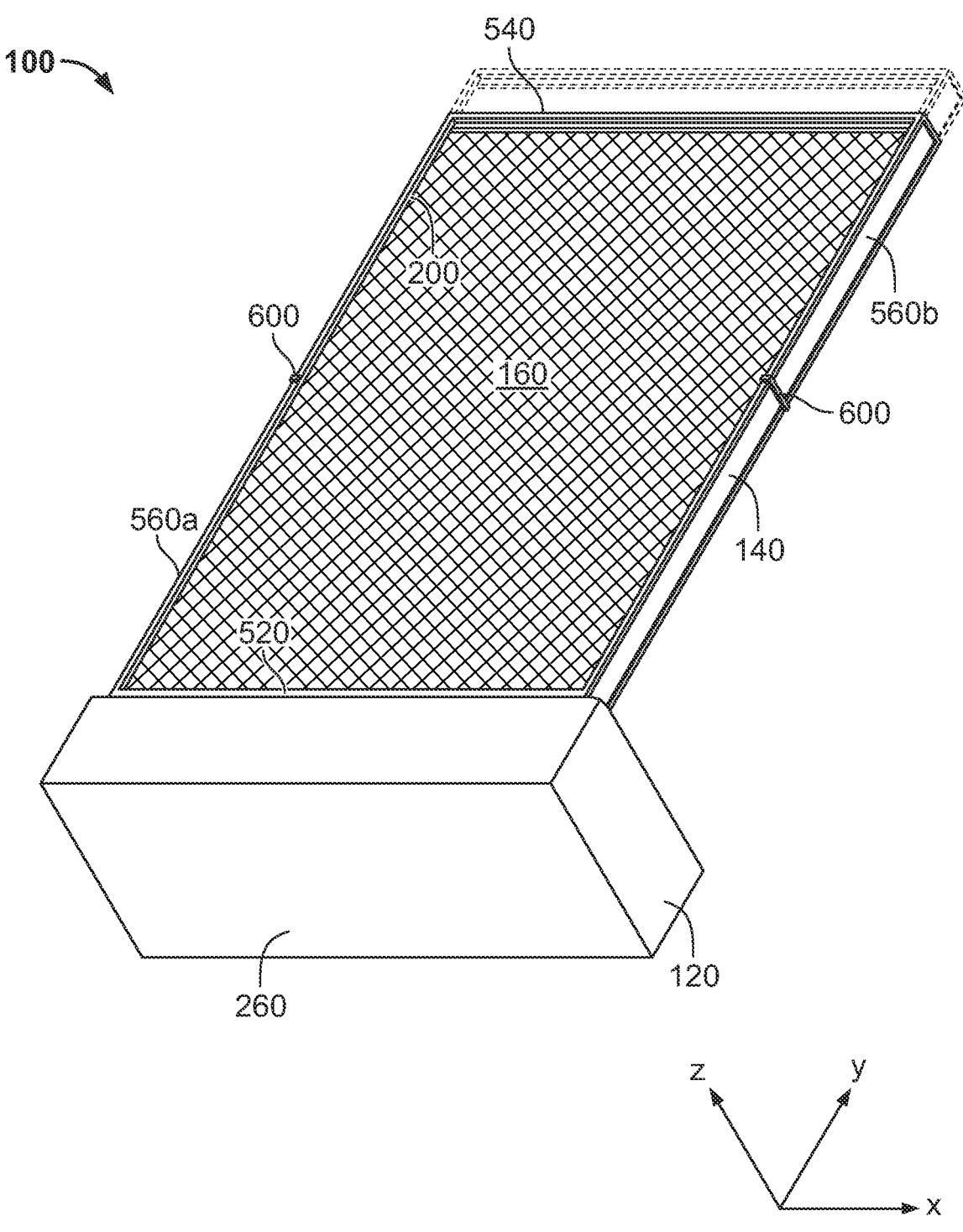
FIG. 1B is a perspective view of the air filter assembly of FIG. 1A, showing an adjustable feature thereof.
Figure 1C:
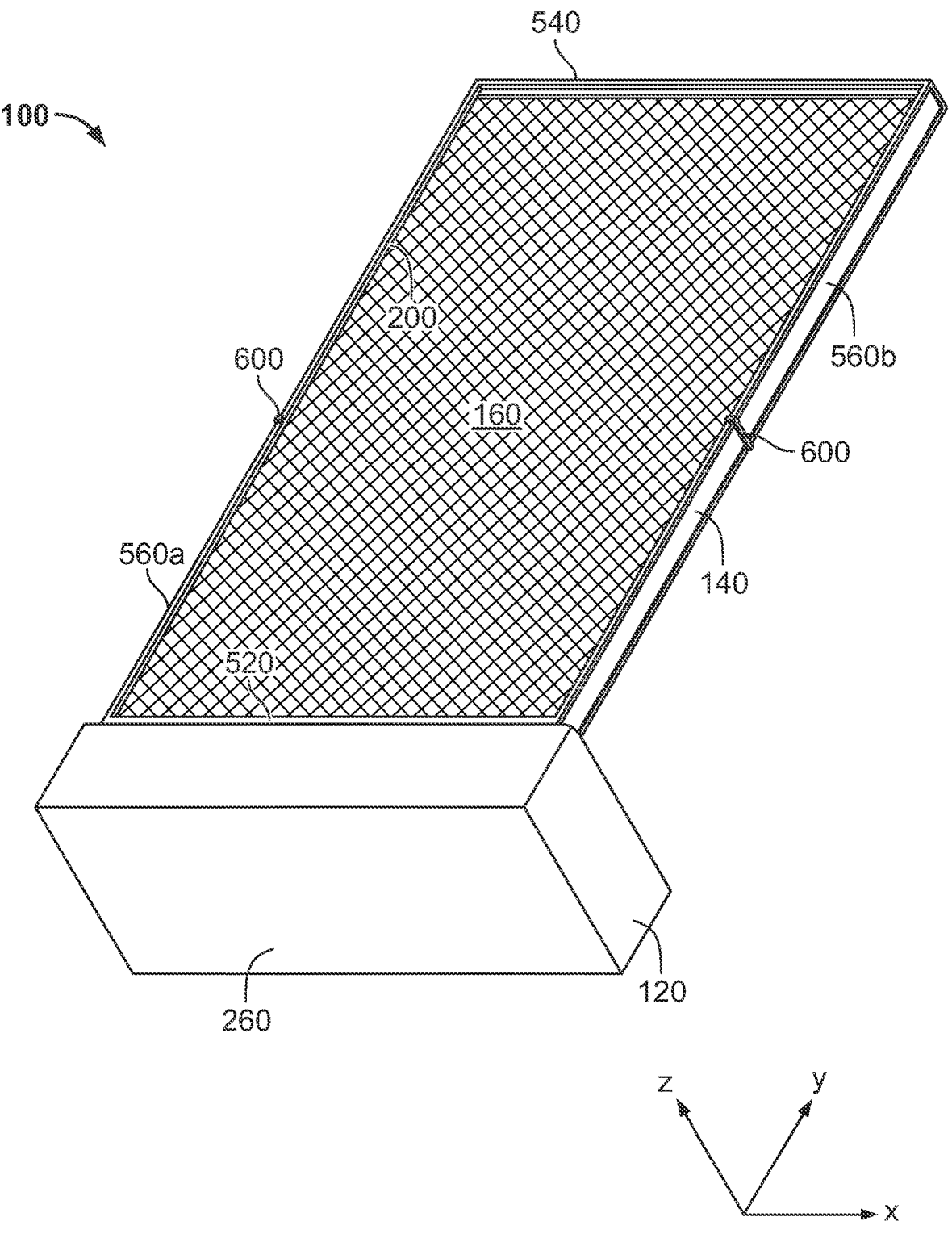
FIG. 1C is a perspective view of the air filter assembly of FIG. 1B, showing the adjustable feature in an adjusted position.

The drawings are not necessarily to scale, and certain features and certain views of the drawings may be shown exaggerated in scale or in schematic in the interest of clarity and conciseness.

DETAILED DESCRIPTION

Apparatus, systems, and methods of varying scope are described herein. It is to be understood that both the foregoing general description and the following detailed description describe various embodiments and are intended to provide an overview or framework for understanding the nature and character of the claimed subject matter. Whenever possible, the same reference numerals will be used throughout the drawings to refer to the same or like parts.

Reference will now be made in detail to the exemplary embodiment(s), examples of which is/are illustrated in the examples. Before describing the exemplary embodiments, it is noted the embodiments reside primarily in combinations of components, subcomponents, and procedures related to a renewing air filter assembly. Accordingly, the product and method components have been represented where appropriate, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "upper" and "lower," and the like, may be used solely to distinguish one entity or element from another entity or element without necessarily requiring or implying any physical or logical relationship, or order between such entities or elements.

In various embodiments, as shown in FIGS. 1A-8, an air filter assembly is disclosed. In some embodiments, as shown in FIGS. 1A-3 and 5-7C, the air filter assembly 100 includes the filter media cartridge 120, the filter frame 140, and the filter media 160. In some embodiments, the filter media 160 extends within the filter frame 140 from and back to the filter media cartridge 120 such that a double layer of the filter media 160a, 160b covers the air flow opening 200 defined by the filter frame 140. In some embodiments, the filter media cartridge 120 and the filter frame 140 are coupled to one another to provide the air filter assembly 100 having a longitudinal axis (y-axis), a lateral axis (x-axis), and a transverse axis (z-axis).

The filter frame 140 is dimensioned to be closely accommodated within the filter slot of a HVAC air handler. The longitudinal y-axis of the filter frame 140 is configured for the width (sometimes referred to as the long side) of the filter slot; the lateral x-axis is configured for the length (sometimes referred to as the short side) of the filter slot; and the transverse z-axis is configured for the thickness (sometimes referred to as the depth) of the filter slot. In various embodiments, the length of the filter frame 140 is adjustable. In some embodiments, the width of the filter frame 140 is adjustable. In some embodiments, the length and the width of the filter frame 140 are adjustable. In some embodiments, the orientation of the air filter assembly 100 is dictated by the orientation of the filter slot of the HVAC air handler in which it is to be used, as well as the location of adjacent equipment and other possible interferences with inserting the air filter assembly 100 into the filter slot.

During use, the filter media cartridge 120 is configured to automatically supply new filter media 160a to the filter frame 140 and to take up the used filter media 160b from the filter frame 140. In some embodiments, the relative amount of new (unused) filter media 160a supplied corresponds to the relative amount of used filter media 160b taken up. In some embodiments, the amount of new filter media 160a supplied is equal to the amount of used filter media 160b taken up. For example, if one inch of new filter media is supplied to the filter frame 140 over a pre-determined period, then one inch of used filter media will be taken up from the filter frame 140 during that period.

Figure 5:
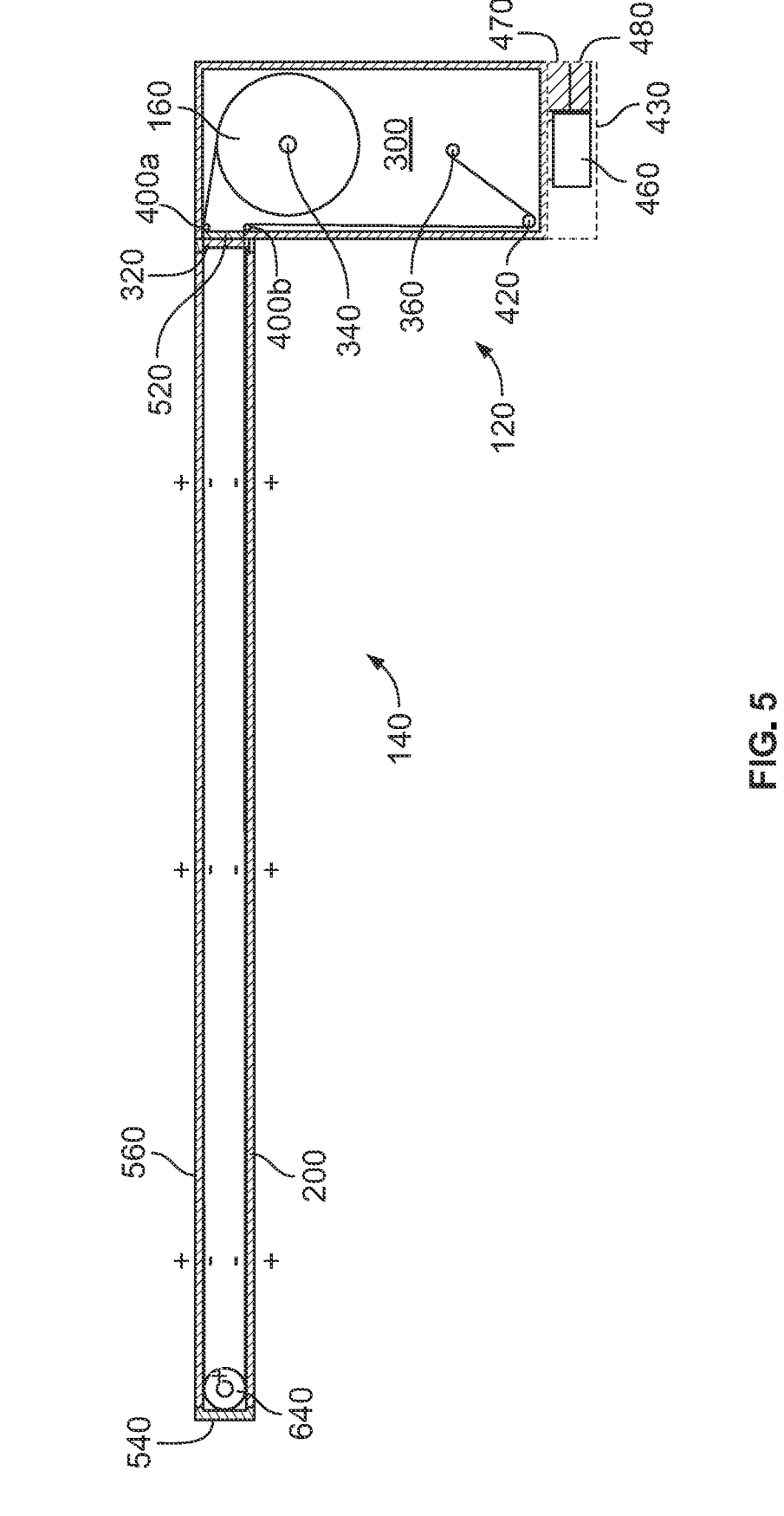
FIG. 5 is a sectional view taken along line 4-4 of FIG. 2, in accordance with embodiments described herein.
Figure 6:
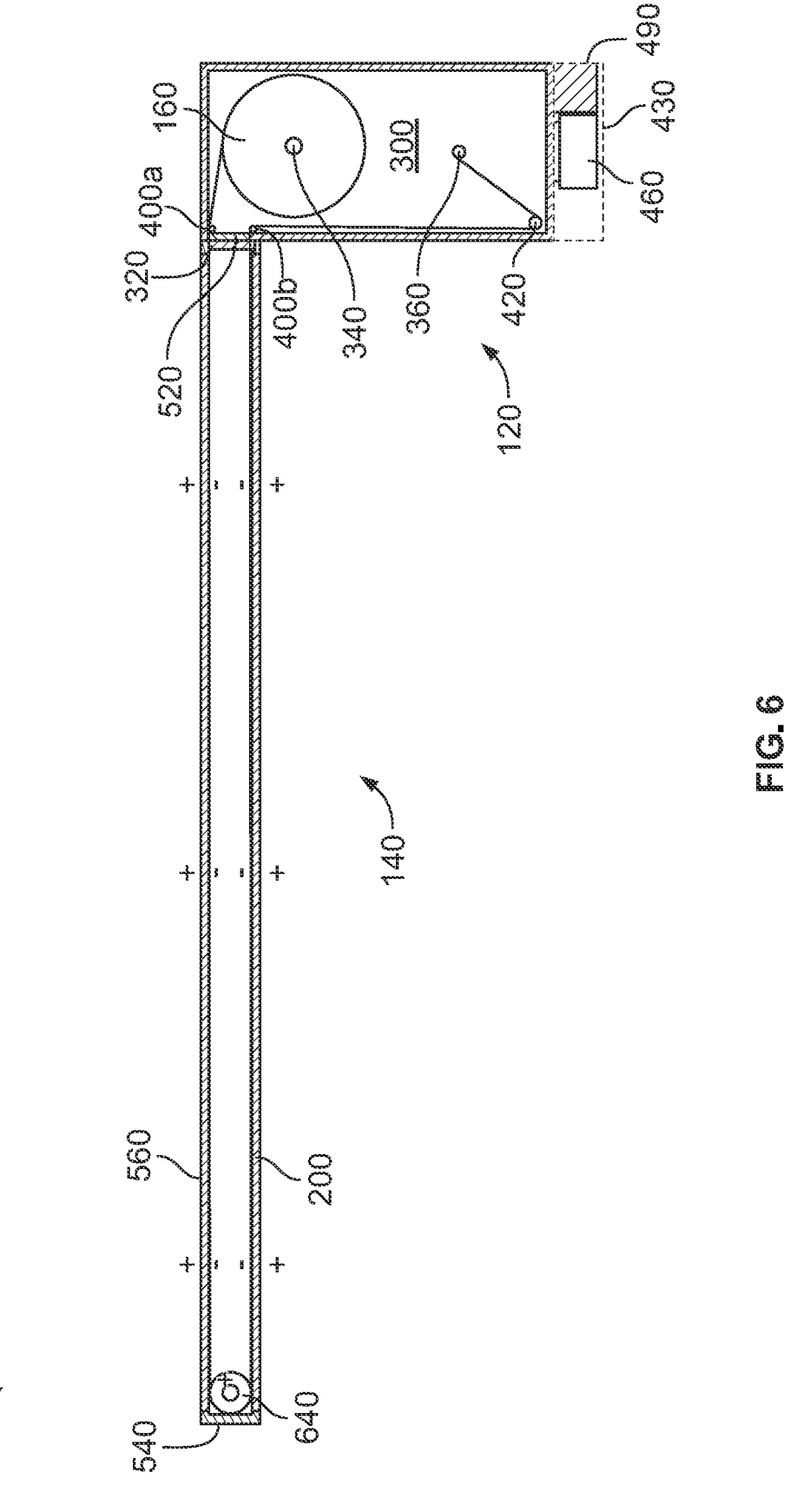
FIG. 6 is a sectional view taken along line 4-4 of FIG. 2, in accordance with embodiments described herein.
Figure 7A:
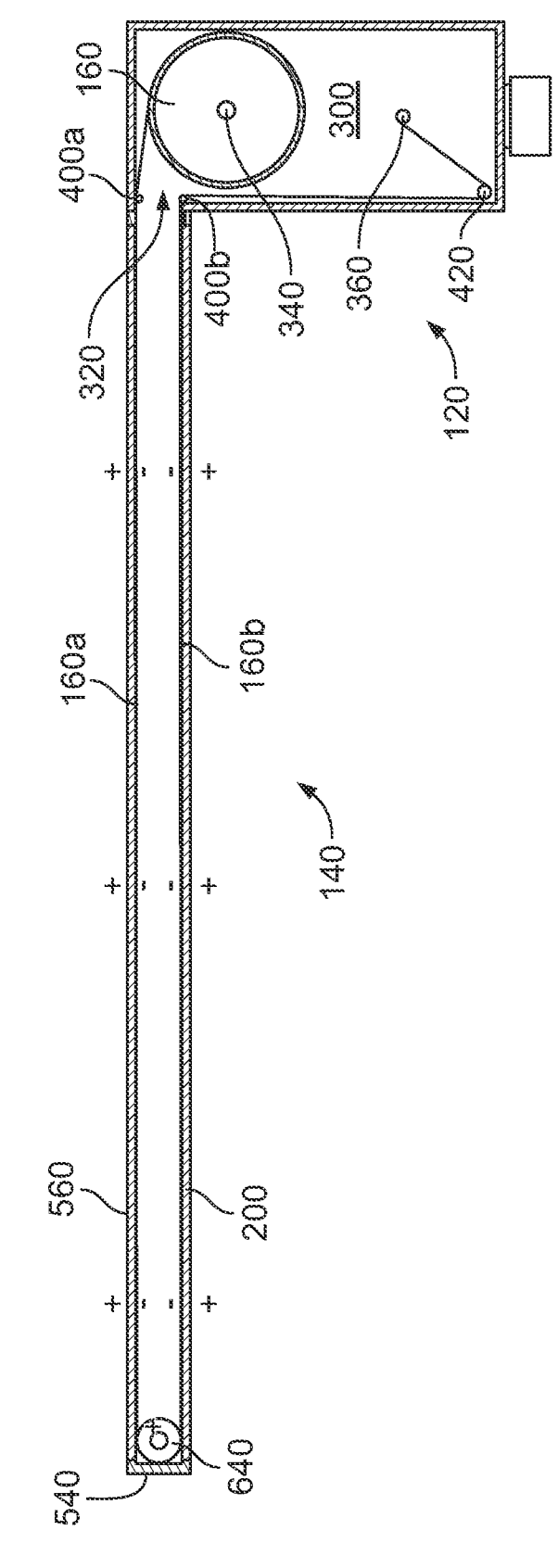
FIG. 7A is a sectional view taken along line 4-4 of FIG. 2, in accordance with embodiments described herein.
Figure 7B:
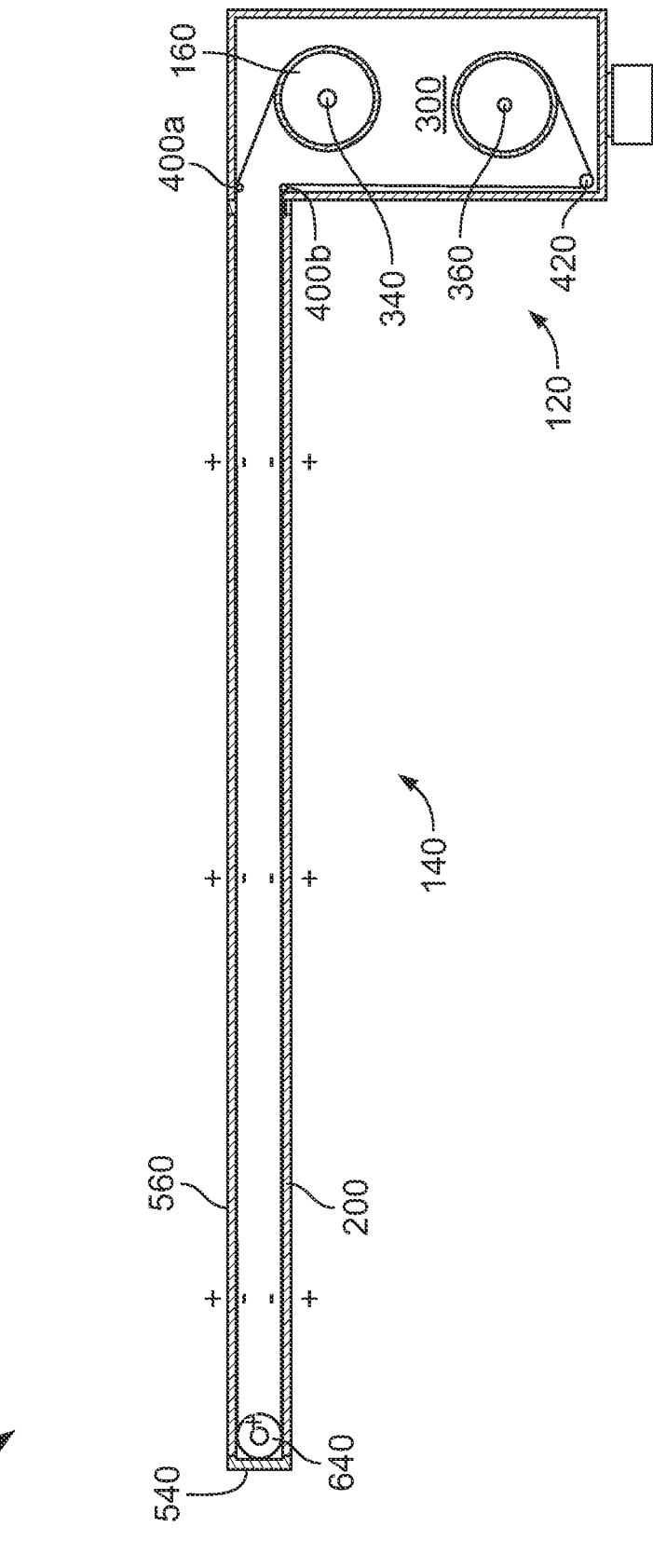
FIG. 7B is a sectional view taken along line 4-4 of FIG. 2, in accordance with embodiments described herein.
Figure 7C:
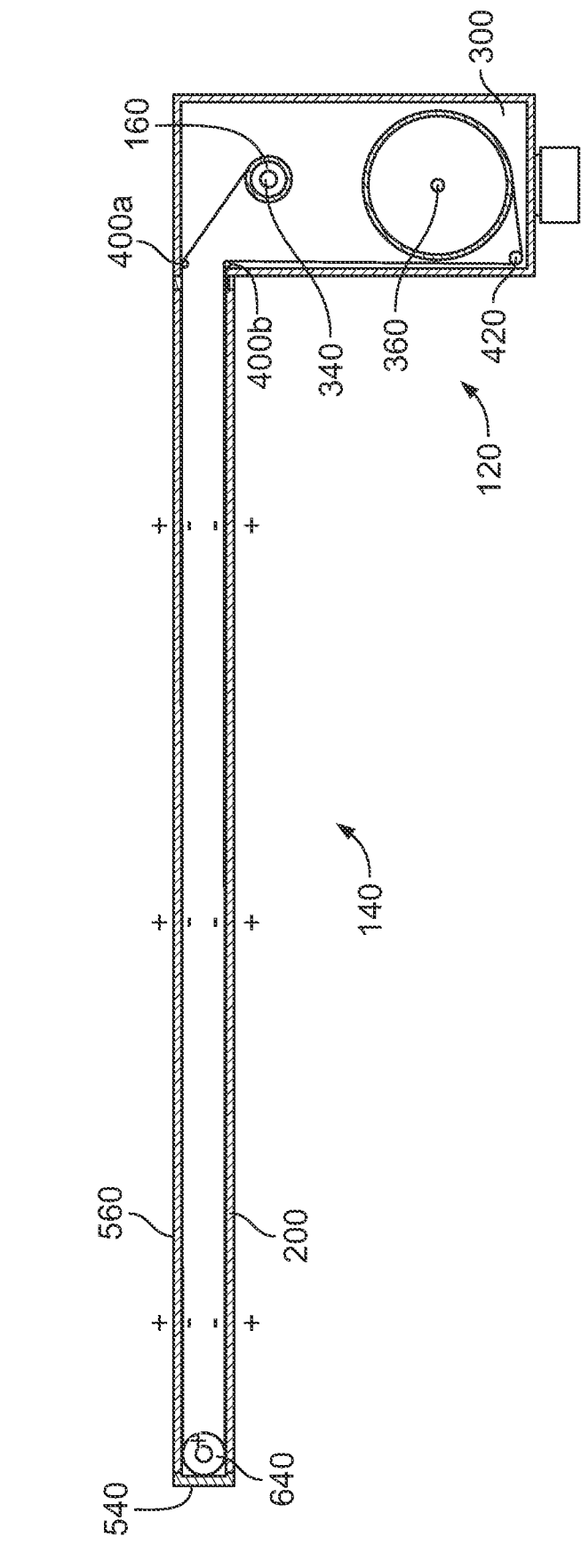
FIG. 7C is a sectional view taken along line 4-4 of FIG. 2, in accordance with embodiments described herein.

In various embodiments, as shown in FIGS. 1A-3 and 5-7C, the filter media cartridge 120 includes the cartridge body 260, which is a housing structure that defines the internal volume 300. In some embodiments, the cartridge body 260 comprises a plurality of walls that define the housing structure. In some embodiments, the plurality of walls form a rectangular cuboid three-dimensional shape. The internal volume 300 can have any suitable size. In this context, the suitability refers to a size configured to contain one or more rolls of the filter media rolls 160, as shown in FIGS. 5-7C, the corresponding rollers, and one or more components utilized to power the rollers in order to supply the new filter media 160a and to take up the used filter media 160b. In some embodiments, the internal volume 300 is sized to include each of the components, as shown by the broken lines 410 in FIGS. 2 and 430 in FIGS. 5 and 6. In some embodiments, the internal volume 300 is sized to include some components (i.e., not all components), as shown in FIGS. 7A-7C. In such embodiments, the cartridge body 260 is configured to allow one or more external components to be mounted, permanently or temporarily, thereon. In some embodiments, the cartridge body 260 and the internal volume 300 are configured with two or more compartments that are separated by a solid structure. In such embodiments, the separate compartments can have independent openings for accessing the components positioned therein.

In some embodiments, the filter media cartridge 120 includes the cartridge aperture 320, as shown in the cross-section views of FIGS. 5-7C. In such embodiments, the cartridge aperture 320 extends along the length (x-axis) of an upper portion (e.g., the upper edge) of a wall of the cartridge body 260 and provides a channel of communication between the internal volume 300 and the air flow opening 200 defined by the filter frame 140. In this context, the term "upper edge" refers to the air flow opening 200 as shown in FIGS. 5-7C. In some embodiments, the filter frame 140 is coupled to the cartridge body 260 at the aperture 320. In such embodiments, the filter media 160a, 160b enters and exits the cartridge body 260 and the filter frame 140 through the aperture 320. As the new filter media 160a leaves the supply roller 340, it is guided to the upper edge of the cartridge aperture 320 by the aperture routing roller 400a, as shown in FIG. 5.

The cartridge aperture 320 can have any suitable height (z-axis). In this context, the suitability of the height means the new filter media 160a and the used filter media 160b will remain spaced apart and avoid contact with one another. In some embodiments, for example, the cartridge aperture 320 has a height in the range of 0.5 mm to 10 mm, or from 1 mm to 5 mm, etc., each range including the endpoints and any intermediate value therebetween. In some embodiments, the new filter media 160a and the used filter media 160b will be electrostatically charged, and the spaced distance between the filter media 160a, 160b is beneficial to the effect of the respective electrostatic charges. Furthermore, the spaced distance between the filter media 160a, 160b keeps the portion of filter media having contaminants separated from the portion of filter media that is new and not contaminated.

In some embodiments, the filter media supply roller 340 holds the new filter media 160a while a filter media take up roller 360 collects and holds the used filter media 160b. In such embodiments, the take up roller 360 rolls up the used filter media 160b as it departs the air flow opening 200 defined by the filter frame 140 and enters the filter media cartridge 120 through the cartridge aperture 320. In some embodiments, as shown in FIGS. 7A-7C, the cartridge aperture 320 is an opening at the position where the filter frame 140 is joined to the filter media cartridge 120. In some embodiments, as shown in FIGS. 5 and 6, the cartridge aperture 320 is a pair of slots at the position where the filter frame 140 is joined to the filter media cartridge 120, whereby one slot is positioned for the unused filter media 160a derived from the supply roller 340 to pass from the filter media cartridge 120 to the filter frame 140, and the other slot is positioned for the used filter media 160b to pass from the filter frame 140 back to the filter media cartridge 120. In such embodiments, the pair of slots forming the cartridge aperture 320 are separated by the wall(s) extending laterally about the x-axis of the joined filter frame 140 and filter media cartridge 120.

In some embodiments, as shown in FIG. 5, for example, the used filter media 160b passes through the lower edge of the cartridge aperture 320 as it enters the filter media cartridge 120. Once inside the filter media cartridge 120, the used filter media 160b is guided to the take up roller 360 via the lower aperture routing roller 400b. The upper and lower aperture routing rollers 400a, 400b ensure the new and used portions of the filter media 160a, 160b remain separated while passing through the aperture 320 into the filter frame 140. In some embodiments, the take up routing roller 420 routes the returning, used filter media 160b from the lower aperture routing roller 400b to the take up roller 360. In some embodiments, as shown in FIG. 5, the take up routing roller 420 is positioned under (with respect to the z-axis) the lower aperture routing roller 400b. In such embodiments, the lower aperture routing roller 400b is positioned in proximity to the lower edge of the aperture 320, on the filter-frame-facing side (first side) of the filter media cartridge 120, and the take up roller 360 is also positioned in proximity to the first side of the filter media cartridge 120. The rollers 340, 360 can have any suitable shape. For example, the rollers can be cylindrical about their respective lengths and have a circular three-dimensional shape; or the rollers can be generally cylindrical about their respective lengths with concave (hourglass) shape from end-to-end (when viewed from the side) that is configured to accommodate the rolls of filter media.

In some embodiments, the filter media is automatically renewed by driving the take up roller 360 via the motor 440. In some embodiments, the motor 440 is powered by the power supply 460. In some embodiments, the power supply 460 comprises one or more batteries (e.g., 9V batteries, rechargeable batteries, etc.). In some embodiments, the power supply 460 comprises an AC or DC plug-in power supply. In some embodiments, the motor 440 is wired directly into the electrical panel of the air handler. In some embodiments, the motor 440 is connected to a combination of two or more of the battery, plug-in, and direct wiring options. In such embodiments, as shown in FIG. 6, for example, air filter assembly 100 includes the power supply 460 (AC or DC plug-in power supply) and the second power supply 490 (e.g., battery).

In some embodiments, the motor 440 operates at a speed slow enough for a timer circuit to be used to operate the take up roller 360. In such embodiments, the timer circuit can be configured to operate the take up roller 360 for a predetermined period. In some embodiments, the predetermined period is in a range of 2 to 100 hours, 4 to 80 hours, 6 to 60 hours, 8 to 45 hours, 12 to 36 hours, including, for example 12, 24, 36, 48, and 60 hours, and including the endpoints and any intermediate value therebetween. In some embodiments, the motor 440 can operate continuously. In some embodiments, the motor 440 is operated such that a constant length of filter media is supplied and taken up during the predetermined period. In some embodiments, for example, the motor 440 could be operated to completely exchange the filter media positioned within the filter frame 140 one or more times (e.g., once, twice, thrice) during the predetermined period.

Figure 3:
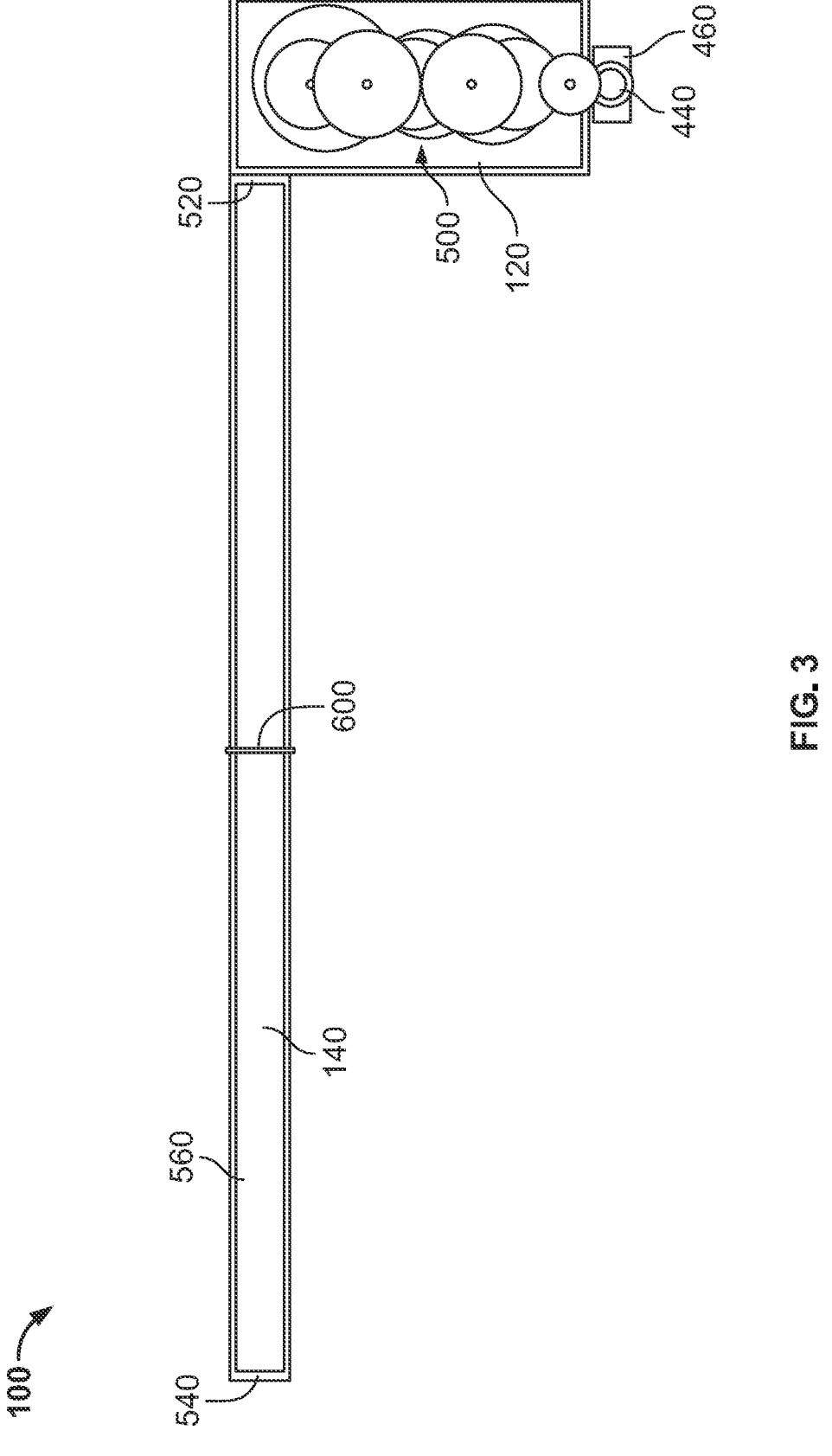
FIG. 3 is a side view of the air filter assembly of FIG. 1A, in accordance with embodiments described herein.

In some embodiments, as shown in FIG. 3, the reduction gearset 500 can be used to reduce the output speed of the motor 440 to a lower speed. In some embodiments, for example, the reduction gearset 500 reduces the output speed by 50:1, 100:1, 250:1, 500:1, 750:1, 1000:1, 1250:1, 1500:1, 1750:1, 2000:1, 2250:1, 2500:1, 2750:1, 3000:1, etc. Because the length of the filter media 160b taken up by one rotation of the take up roller 360 will increase over time as more of the filter media 160b is taken up onto the take up roller 360, the operational duration and/or speed of the motor 440 can be altered by the gearset 500 to ensure a consistent length of filter media 160b is taken up over a predetermined period.

In some embodiments, as shown in FIGS. 3, 4A, and 4B, the gearset 500 can include a plurality of gears. To simplify the drawings, the teeth of the respective gears have been omitted from the figures. In some embodiments, the gearset 500 includes a plurality of compound gears, wherein each gear includes a driver gear and a driven gear fused together. In such embodiments, the driver gear is the smaller gear with less teeth and the driven gear is the larger gear with more teeth. In some embodiments, the individual gears of the gearset 500 are arranged and configured to interact with one another to reduce the output speed. In some embodiments, the gearset 500 comprises the motor pinion 502, which is connected at one end to the motor 440 and to the opposite end to the driven gear of the first gear 504; the drive gear of the first gear 504 is connected to the driven gear of the second gear 506; the drive gear of the second gear 506 is connected to the driven gear of the third gear 508; the drive gear of the third gear 508 is connected to the driven gear of the fourth gear 510; and the drive gear of the fourth gear 510 is the output gear connected to the take up roller 360 through the pinion-type arm 512. In such embodiments, the torque generated by the motor 440 and gearset 500 is used to drive the take up roller 360. In alternative embodiments, the gearset 500 can be configured to drive the supply roller 340; or the gearset 500 can be configured to drive both the take up roller 360 and the supply roller 340. In some embodiments, for example, the gearset 500 can include a plurality of pinion-type arms projecting from a gear that engages the take up roller 360 and/or the supply roller 340.

In some embodiments, as shown in FIG. 5, the air filter assembly 100 includes the solenoid 480 and the relay 470. In such embodiments, the solenoid 480 and the relay 470 are used in addition to or instead of the gearset 500. In such embodiments, the solenoid 480 and is used to convert electrical energy supplied from the power supply 460 and convert it into mechanical energy to start the motor 440 and/or control the power sent to the motor 440. In such embodiments, the relay 470 is configured to control when the motor 440 is active and inactive, including the period (duration) of active use and the frequency of active uses. For example, the relay 470 can send a signal to the motor 440 to fire for a duration of 5 seconds (or 10 seconds, 15 seconds, 20 seconds, etc.) to move the filter media a certain distance (e.g., 1 inch, 2 inches, 3 inches, etc.). At the end of the duration, the relay 470 can send a signal to the motor 440 to stop.

In various embodiments, as shown in FIGS. 1A-3, the filter frame 140 includes a first end and a second end spaced apart from the first end. In some embodiments, the first (proximal) end frame section 520 is connected to the filter media cartridge 120 at the cartridge aperture 320, and the second (distal) end frame section 540 at the opposite end. In some embodiments, the filter frame 140 has a rectangular shape. In such embodiments, the end frame sections 520, 540 are connected by the side frame sections 560a, 560b. In some embodiments, the side frame sections 560a, 560b are parallel to one another and perpendicular to the end frame sections 520, 540. In some embodiments, the air flow opening 200 of the filter frame 140 is defined by the respective spans between the end frame sections 520, 540 and the side frame sections 560a, 560b. The air flow opening 200 is the area where air can flow through the air filter assembly to the HVAC air handler.

In some embodiments, the side frame sections 560a, 560b can include expansion joints 600, which advantageously allow the side frame sections 560a, 560b to be lengthened or shortened to accommodate a range of widths (y-axis) of air handler filter slots. In some embodiments, the expansion joints 600 are formed from telescoping, nested portions of the side frame sections. In some embodiments, the expansion joints 600 are ball bearing side mount filter frame slides adapted to extend the side frame sections 560*a,* 560*b* outward (away from) and inward (toward) with respect to the filter media cartridge 120. In some embodiments, the expansion joints 600 and side frame sections 560*a,* 560*b* include one or more locking mechanisms such that when the side frame sections 560*a,* 560*b* are extended outward and away from the expansion joints 600 to the desired length for a particular filter slot of a HVAC air handler, they can be locked into position and can maintain that position during use. Any suitable locking mechanism can be used, including, for example, a spring stop, clamp, stop pin, spring ball and pin, clips, and combinations thereof.

Figure 2:
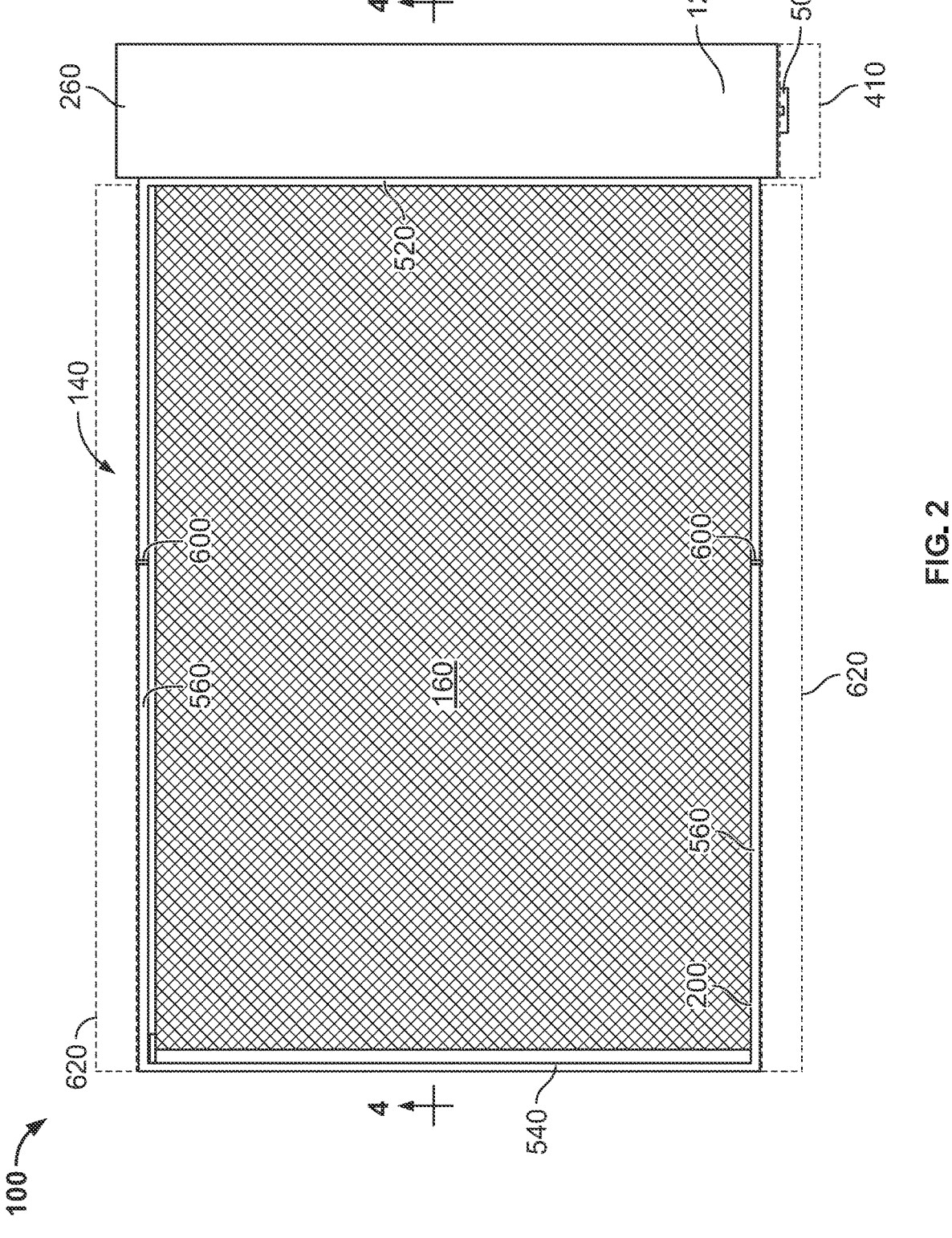
FIG. 2 is a top view of the air filter assembly of FIG. 1A.
Figure 8:
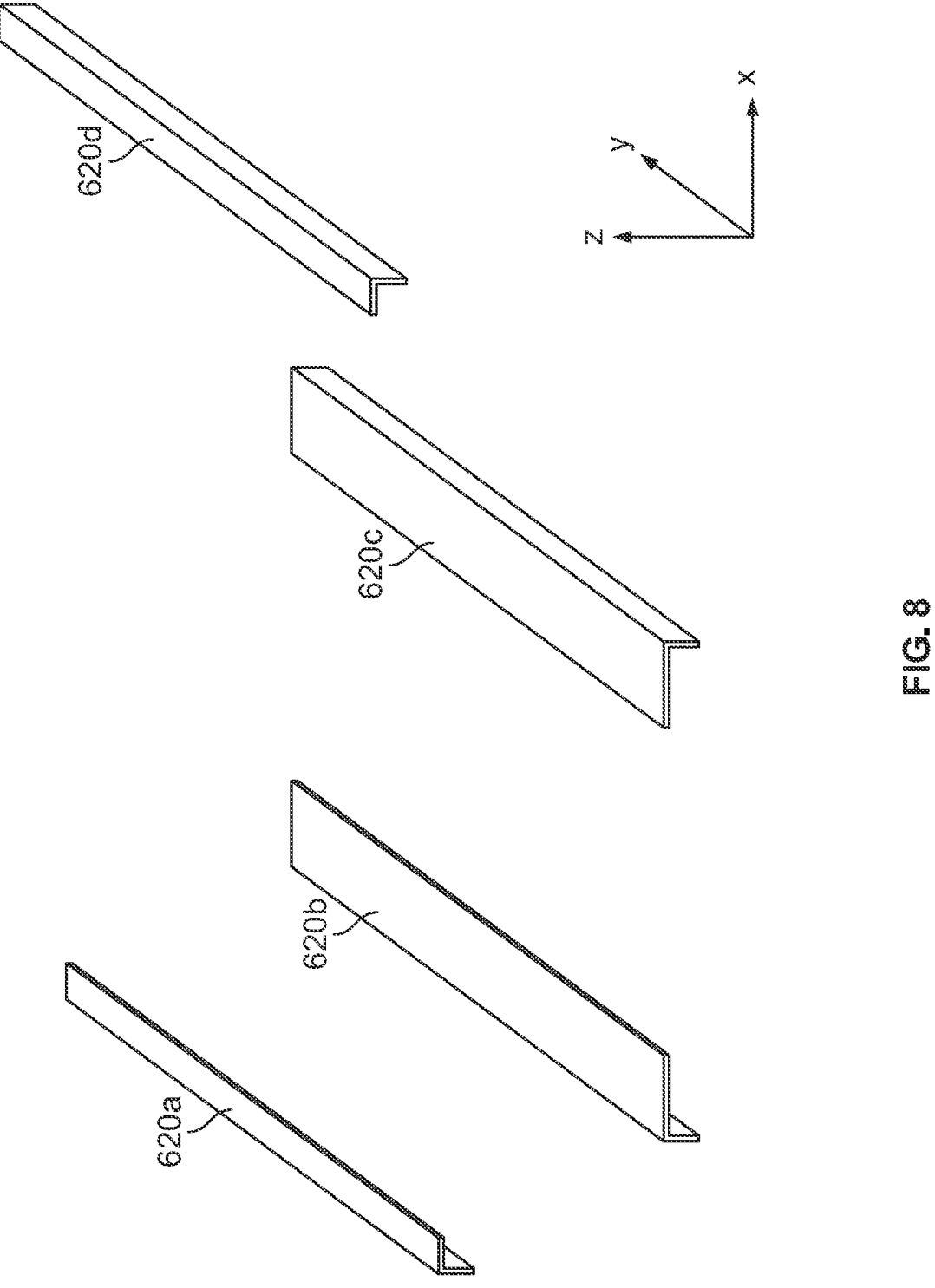
FIG. 8 is a perspective view of exemplary length-extending flaps, in accordance with embodiments described herein.

In some embodiments, each of the respective the side frame sections 560*a,* 560*b* can independently include a blocking section to accommodate a range of lengths (x-axis) of air handler filter slots. In some embodiments, as shown in FIGS. 2 and 8, the blocking sections can be sized, shaped, and configured to be coupled to the side frame sections 560*a,* 560*b*. In some embodiments, a pair of blocking sections are used to adjust the length of the side frame sections 560*a,* 560*b*. With reference to FIG. 8, for example, the blocking sections 620*a* and 620*d* of identical size, or the blocking sections 620*b* and 620*c* of identical size, or the blocking sections 620*a* and 620*c* of different sizes, etc., can be used to lengthen the side frame sections 560*a,* 560 as needed.

In some embodiments, the blocking sections 620 are removably coupled to the side frame sections 560*a,* 560*b*. In some embodiments, the blocking sections 620 are permanently coupled to the side frame sections 560*a,* 560*b*. The blocking sections 620 can be coupled to the side frame sections 560*a,* 560*b* using any suitable joining technique. For example, the blocking sections 620 can include a lip that snaps or slides into a corresponding groove or rail of the side frame sections 560*a,* 560*b;* or the blocking sections 620 can be coupled to the side frame sections 560*a,* 560*b* using a suitable fastener (e.g., bolt, clip, double-sided tape, adhesive, etc.).

In some embodiments, as shown in FIG. 8, the blocking sections 620 can have an L-shape having a pair of members joined together at approximately a right angle. In such embodiments, the blocking sections 620 have a first member that is sized, shaped, and configured (about the z axis) to be coupled to the side frame sections 560*a,* 560*b*, and a second member coupled to the first member that is sized, shaped, and configured (about the x-axis) to adjust the length of the filter frame 140 to the corresponding length of the air handler filter slot it is to be used in. The blocking sections 620 can be comprised of any suitable material. In some embodiments, for example, the blocking sections 620 are made from a metal, plastic, wood, closed cell foam, or combinations thereof.

During use, after the blocking sections 620 are attached to sides of the side frame sections 560*a,* 560*b* to accommodate different lengths of air handler filter slots, the blocking sections 620 may result in a smaller opening than would be present in a conventional filter. But the continuously renewed filter media 160*a* will, within a certain range, still result in lower amount of accumulated air handler motor stress than would be encountered over the life of the conventional filter.

In some embodiments, the air filter assembly 100 and one or more pairs of the blocking sections 620 are configured as a kit. In such embodiments, the kit can include, for example, the air filter assembly 100, a first pair of blocking sections 620*a,* 620*d,* and a second pair of blocking sections 620*b,*

620*c*. In some embodiments, the kit can further include one or more batteries for use as the power supply 460.

In various embodiments, the filter frame 140 includes a roller for changing the direction of the filter media. For example, as shown in FIGS. 5-7C, the filter frame 140 includes the filter frame end roller 640. In some embodiments, the filter frame end roller 640 is positioned at the second (distal) end section 540 of the filter frame 140. In some embodiments, the new filter media 160*a* from the supply roller 340 is routed by the upper aperture routing roller 400*a* to the filter frame end roller 640, and then rotates around the filter frame end roller 640 where the used filter media 160*b* returns to the take up roller 360. In some embodiments, the used filter media 160*b* returns from the filter frame end roller 640 and is guided to the take up roller 360 by the lower aperture routing roller 400*b* and the take up routing roller 420.

In some embodiments, a double layer of the new and used filter media 160*a,* 160*b* is provided to air flow passing through the opening 200. In some embodiments, the tension on the filter media 160*a,* 160*b* between the end roller 640 and the supply and take up rollers 340, 360 is configured such that, when the air handler air flow is present, the tension is sufficient to maintain a separation between the two layers of filter media 160*a,* 160*b* extending across the opening 200 as well as to ensure both layers remain within the filter frame 140. In some embodiments, the tension on the filter media, additional rollers, gratings, or the like can be included in the filter frame 140 to achieve these objectives.

In various embodiments, the filter frame 140 and the filter media cartridge 120 are coupled one another. In some embodiments, the filter frame 140 and the filter media cartridge 120 are permanently coupled one another. In some embodiments, the filter frame 140 and the filter media cartridge 120 are removably coupled one another. In such embodiments, the filter frame 140 and the filter media cartridge 120 may be coupled using any suitable means, including, for example, a lip and rail configuration, whereby the filter frame includes a rail and the filter media cartridge includes a corresponding lip that is configured to slide into the rail, or vice versa; or a snap fit configuration, whereby the filter frame includes a female joint and the filter media cartridge includes a corresponding male joint configured to snap into the female joint, or vice versa. In such embodiments, the filter media cartridge 120 may be replaced after the roll of filter media has been used or substantially used.

Any suitable filter media 160*a,* 160*b* can be utilized, depending on the desired degree of filtration and/or other filtration objectives. In some embodiments, the filter media has a rating of effectiveness according to the minimum efficiency reporting value (MERV) in the range of 5-8, which is configured to contain impurities having a minimum particle size in the range of 10.0-3.0 micrometers (microns); or a MERV in the range of 9-12, which is configured to contain impurities having a minimum particle size in the range of 3.0-1.0 micrometers; or a MERV in the range of 13-16, which is configured to contain impurities having a minimum particle size in the range of 1.0-0.3 microns. In some embodiments, for example, the filter media is a high efficiency particulate air (HEPA) filter media, which exhibits a minimum efficiency of 99.97% when tested with an aerosol of 0.3 micrometer diameter, according to the U.S. Department of Energy Technical Standard (DOE-STD-3020-2015; June 2015). In some embodiments, the filter media is constructed out of, for example, polyester, cottonpolyester, expanded metal, fiberglass, carbon fiber, synthetic fiber material, mechanical synthetic, hog hair, or one or more combinations thereof.

In some embodiments, the filter media 160a, 160b is electrostatically charged. In such embodiments, the electrostatic charge can attract particles regardless of their size. In the depicted double layer configuration of the filter assembly 100, the electrostatically charged filter media is particularly advantageous. Because the surfaces of the double layer configuration are oppositely charged (see (+) and (−) indications in FIGS. 5-7C), particulates that escape both layers are less likely to retain any static charge and therefore less likely to adhere to downstream surfaces within HVAC ducting or within the conditioned structure.

Using the air filter assembly described herein can involve one or more steps. For example, the filter slot of the HVAC unit should be determined. If not already known, the filter slot should be measured to acquire the length, width, and depth. Next, the length and width of the air filter assembly should be adjusted to accommodate the filter slot. For example, the side frame sections should be lengthened or shortened to accommodate the width of the filter slot, and optionally locked into the desired width. For example, the blocking sections can be attached to sides of the side frame sections to accommodate different lengths of the filter slot. Prior to connecting the blocking sections to the side frame sections, the blocking section may be shortened as needed to the appropriate width of the filter slot. For example, the blocking sections may have perforated break points configured to allow the user to break or cut a portion away in order to adjust the length. After the length and width of the air filter assembly are adjusted to the appropriate size, it is inserted into the filter slot of the HVAC unit. The air filter assembly power source is then activated. For example, one or more batteries are inserted into a battery receptacle that is connected to the motor, or the motor is wired directly or indirectly to an AC or DC power supply. Once installed, the air filter assembly is configured to automatically advance a portion of the filter media from the supply roller and retrieve a corresponding portion of the filter media to the take up roller. The portion of the filter media that is incrementally advanced and/or retrieved is based on the configurations of the motor, solenoid and relay, or gearset components. For example, the configurations may allow for the take up roller to retrieve one inch of filter media per month (e.g., 30 days), week (7 days), or one or more days, such that over the course of a predetermined period (e.g., 10, 15, 20, 25, 30 days), the filter media in the air flow opening defined by the filter frame has been completely replaced with new filter media.

The foregoing embodiments are provided to aid in the understanding of the present disclosure, the true scope of which is set forth in the appended claims. One of skill in the art would appreciate that modifications can be made in the embodiments set forth without departing from the spirit of the disclosure.

Exemplary embodiments and examples of the products, systems, and methods are described above in detail. The products, systems, and methods are not limited to the specific embodiments described herein, but rather, components of the products, systems, and/or steps of the method may be utilized independently and separately from other components and/or steps described herein. For example, the products or systems may also be used in combination with other products, systems, or methods, and is not limited to practice with only a product or system as described herein. Rather, the exemplary embodiment can be implemented and utilized in connection with many other products or systems.

A recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. As will be understood by one skilled in the art, ranges disclosed herein encompass any and all possible subranges and combinations of subranges thereof. Any listed range can be easily recognized as sufficiently describing the same range being broken down into at least equal halves, thirds, quarters, fifths, tenths, etc. As a non-limiting example, each range discussed herein can be readily broken down into a lower third, middle third and upper third, etc. As will also be understood by one skilled in the art, language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a range of 1-3 batteries refers to having 1, 2, or 3 batteries. Similarly, a range of 1-5 batteries refers to having 1, 2, 3, 4, or 5 batteries, and so forth.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context.

As used herein, the use of examples, or exemplary language (e.g., "such as"), is intended to illuminate the embodiments and does not pose a limitation on the scope of the claims unless otherwise stated. No language in the specification should be construed as indicating any non-claimed element as essential.

As used herein, the terms "about" and "substantially" will be understood by persons of ordinary skill in the art and will vary to some extent depending upon the context in which it is used. If there are uses of the term which are not clear to persons of ordinary skill in the art, given the context in which it is used, "about" and "substantially" will mean up to plus or minus 10% of the particular term.

This written description uses examples to disclose the present embodiments, including the best mode, and to enable any person skilled in the art to practice the present embodiments, including carrying out the steps of the method. The patentable scope of the present embodiments is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. An air filter assembly, comprising:

a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume;

wherein the filter frame has a rectangular cuboid shape with a longitudinal axis and a lateral axis, the filter frame being configured to be received by an air handler filter slot of a heating, ventilation, and air conditioning (HVAC) system; and wherein the filter media extends about the longitudinal axis of the filter frame from and back to the filter media cartridge such that a double layer of the filter media covers the air flow opening;

wherein the filter frame comprises an end roller positioned at a second end of the filter frame, wherein the filter media from the supply roller is routed through the air flow opening from the first end to the end roller, which then returns the filter media to the first end;

wherein the filter frame comprises a pair of side frame sections separate from the filter media and located along longitudinal perimeters of the filter media and extending from the first end to the second end of the filter frame, wherein each respective side frame section comprises an expansion joint that allows the side frame section to be lengthened or shortened about the longitudinal axis to accommodate air handler filter slots of various widths;

wherein each expansion joint is a telescoping, nested portion of the respective side frame section; and wherein at least one expansion joint or at least one side frame section includes one or more locking mechanism such that when the side frame sections are extended outward and away from the expansion joints they can be locked into position and can maintain that position during use.

2. The air filter assembly of claim 1, wherein the filter media cartridge further comprises a motor for driving the filter media from the supply roller, through the air flow opening, and to the take up roller.

3. The air filter assembly of claim 2, wherein the motor is powered by one or more batteries, an AC or DC power supply, the HVAC system, or a combination thereof.

4. The air filter assembly of claim 1, wherein the filter media from the supply roller is guided by an upper aperture routing roller to the air flow opening, the upper aperture routing roller being positioned adjacent to a first edge of the aperture.

5. The air filter assembly of claim 4, wherein the filter media returns from the end roller and is guided to the take up roller by a lower aperture routing roller, the lower aperture routing roller being positioned adjacent to a second edge of the aperture.

6. The air filter assembly of claim 5, wherein the filter media is guided by a take up routing roller in the internal volume, the take up routing roller being positioned adjacent to the cartridge body wall and coplanar to the lower aperture routing roller.

7. The air filter assembly of claim 1, wherein the filter frame is removably connected at the first end to the filter media cartridge.

8. The air filter assembly of claim 1, wherein the filter frame comprises a pair of side frame sections, wherein each respective side frame section comprises a blocking section that allows the side frame section to accommodate a range of lengths of air handler filter slots.

9. The air filter assembly of claim 1, wherein the filter media is electrostatically charged, and the respective layers of the double layer of the filter media have opposite charges.

10. An air filter assembly, comprising:

a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume;

wherein the filter frame is a rectangular cuboid having a longitudinal axis and a lateral axis, the filter frame being configured to be received by an air handler filter slot of a heating, ventilation, and air conditioning (HVAC) system; and wherein the filter frame comprises a pair of side frame sections, wherein each respective side frame section includes an expansion joint that allows the side frame section to be lengthened or shortened about the longitudinal axis to accommodate air handler filter slots of various widths;

wherein each expansion joint is a telescoping, nested portion of the respective side frame section; and wherein at least one expansion joint or at least one side frame section includes one or more locking mechanism such that when the side frame sections are extended outward and away from the expansion joints they can be locked into position and can maintain that position during use.

11. The air filter assembly of claim 10, wherein the filter media cartridge further comprises a motor for driving the filter media from the supply roller, through the air flow opening, and to the take up roller.

12. The air filter assembly of claim 10, wherein the filter frame comprises an end roller positioned at a second end of the filter frame, wherein the filter media from the supply roller is routed through the air flow opening from the first end to the end roller, which then returns the filter media to the first end.

13. The air filter assembly of claim 10, wherein each respective side frame section comprises a blocking section that allows the side frame section to accommodate a range of lengths of air handler filter slots.

14. The air filter assembly of claim 10, wherein the filter media extends about the longitudinal axis of the filter frame from and back to the filter media cartridge such that a double layer of the filter media covers the air flow opening; and wherein the filter media is electrostatically charged, and the respective layers of the double layer of the filter media have opposite charges.

15. A method of filtering air before the air passes through an air handler filter slot of a heating, ventilation, and air conditioning (HVAC) system, the method comprising:

providing an air filter assembly comprising:

a filter media cartridge and a filter frame connected at a first end to the filter media cartridge; the filter media cartridge comprising: a cartridge body defining an internal volume; an aperture extending along a length of an upper portion of a cartridge body wall where the filter frame is connected, the aperture providing a channel of communication between the internal volume and an air flow opening defined by the filter frame; a supply roller for supplying a filter media from the internal volume; and a take-up roller for receiving the filter media in the internal volume;

wherein the filter frame is a rectangular cuboid having a longitudinal axis and a lateral axis, the filter frame being configured to be received by an air handler filter slot of a heating, ventilation, and air conditioning (HVAC) system;

wherein the filter media extends about the longitudinal axis of the filter frame from and back to the filter media cartridge such that a double layer of the filter media covers the air flow opening;

wherein the filter frame comprises an end roller positioned at a second end of the filter frame, wherein the filter media from the supply roller is routed through the air flow opening from the first end to the end roller, which then returns the filter media to the first end;

wherein the filter frame comprises a pair of side frame sections separate from the filter media and located along longitudinal perimeters of the filter media and extending from the first end to the second end of the filter frame, wherein each respective side frame section comprises an expansion joint that allows the side frame section to be lengthened or shortened about the longitudinal axis to accommodate air handler filter slots of various widths;

wherein each expansion joint is a telescoping, nested portion of the respective side frame section; and wherein at least one expansion joint or at least one side frame section includes one or more locking mechanism such that when the side frame sections are extended outward and away from the expansion joints they can be locked into position and can maintain that position during use;

installing the air filter assembly into the air handler filter slot; and connecting the air filter assembly to a power source.

16. The method of claim 15, wherein the filter media cartridge further comprises a motor for driving the filter media from the supply roller, through the air flow opening, and to the take up roller.

17. The method of claim 15, wherein the filter frame comprises an end roller positioned at a second end, wherein the filter media from the supply roller is routed through the air flow opening from the first end to the end roller, which then returns the filter media to the first end.

* * * * *